(12) United States Patent
Namiki (10) Patent No.: US 11,030,767 B2
(45) Date of Patent: Jun. 8, 2021

(54) IMAGING APPARATUS AND IMAGING SYSTEM

(71) Applicant: FANUC Corporation, Yamanashi (JP)

(72) Inventor: Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 20 days.

(21) Appl. No.: 16/575,390

(22) Filed: Sep. 19, 2019

(65) Prior Publication Data

US 2020/0098127 A1 Mar. 26, 2020

(30) Foreign Application Priority Data

Sep. 21, 2018 (JP) .............................. JP2018-177328
Jun. 13, 2019 (JP) .............................. JP2019-110661

(51) Int. Cl.
*G06T 7/70* (2017.01)

(52) U.S. Cl.
CPC ............ *G06T 7/70* (2017.01); *G06T 2200/04* (2013.01); *G06T 2207/20081* (2013.01); *G06T 2207/20084* (2013.01)

(58) Field of Classification Search
CPC ............ G06T 7/70; G06T 11/00; G06T 15/00
See application file for complete search history.

(56) References Cited

U.S. PATENT DOCUMENTS

| 10,713,507 B2 * | 7/2020 | Noda ................... G06K 9/6273 |
| 2018/0257225 A1 | 9/2018 | Satou |
| 2018/0373942 A1 * | 12/2018 | Noda ....................... G06N 3/02 |
| 2020/0098127 A1 * | 3/2020 | Namiki ..................... G06T 7/70 |

FOREIGN PATENT DOCUMENTS

JP 2013-24653 A 2/2013

* cited by examiner

*Primary Examiner* — Md K Talukder
(74) *Attorney, Agent, or Firm* — Hauptman Ham, LLP (57) ABSTRACT

An imaging apparatus of this application is an imaging apparatus for performing processing of machine learning related to estimation of a distance image closer to reality related to an object than a distance image related to the object captured by an imaging sensor from the distance image, including a data acquisition unit for acquiring distance image data related to the object; and a preprocessing unit for creating input data from the distance image data related to the object in which processing of machine learning for estimating distance image data close to reality related to the object from the distance image data related to the object is performed using the input data.

20 Claims, 7 Drawing Sheets

DISTANCE IMAGE RELATED TO OBJECT

IDEAL DISTANCE IMAGE RELATED TO OBJECT

IMAGING APPARATUS AND IMAGING SYSTEM

RELATED APPLICATIONS

The present application claims priority to Japanese Patent Application Number 2018-177328 filed Sep. 21, 2018 and Japanese Patent Application Number 2019-110661 filed Jun. 13, 2019, the disclosure of which are hereby incorporated by reference herein in their entirety.

BACKGROUND OF THE INVENTION

1. Field of the Invention

The application relates to an imaging apparatus and an imaging system, and particularly relates to an imaging apparatus and an imaging system capable of acquiring height information on an object.

2. Description of the Related Art

Conventionally, a system has been developed to detect a three-dimensional (3D) position, posture, and shape of an object. For example, there has been a known 3D vision sensor capable of capturing a distance image having distance information as a pixel value. For example, the 3D vision sensor acquires and analyzes images from two sensors (cameras) disposed to have parallax. The 3D vision sensor obtains a distance between a position corresponding to each pixel and the sensor using a technology of triangulation using parallax. In this way, the 3D vision sensor restores the 3D shape of the object (for example, JP 2013-024653 A, etc.).

However, in a distance image captured by a 3D vision sensor of a stereo system, etc., the shape of the object may be broken. For example, when a portion of an object whose distance to the 3D vision sensor rapidly changes is acquired by the two sensors of the 3D vision sensor, it is difficult to correctly associate portions projected on the respective images with each other. For this reason, even in the case of pixels indicating the portion of the object at positions whose distances to the 3D vision sensor are equal to each other, different pieces of distance information may be calculated between the pixels. In this case, the shape of the object in the distance image is broken.

Therefore, there is a desire for an imaging apparatus and an imaging system capable of estimating a distance image of an object closer to reality from a distance image of the object having a broken shape.

SUMMARY OF THE INVENTION

An aspect of the present disclosure restores a distance image in which a shape of an object is broken using machine learning according to the following steps.

Step 1) Computer aided design (CAD) data of an object is acquired.

Step 2) A distance image of the object is acquired. A position/posture of the object on the distance image is acquired using a known analysis method.

Step 3) The position/posture of the object on the distance image is converted into a position/posture of the object viewed from a 3D vision sensor.

Step 4) CAD data of the object and the 3D vision sensor are disposed in a virtual space in a positional relationship between the 3D vision sensor and the object.

Step 5) A distance image close to reality related to the object appearing in the 3D vision sensor in the virtual space is generated.

Step 6) A data set in which a distance image of a real world is input data and a distance image in the virtual space is label data is used as learning data.

Step 7) Steps 1 to 6 are performed for the respective objects. The respective objects may correspond to different types of objects.

Step 8) An acquired set of learning data is learned as a learning data set by a learning device such as a neural network. When the distance image of the real world is input as input data, the learning device converts the distance image into a distance image close to reality.

Further, an aspect of the present disclosure is an imaging apparatus for performing processing of machine learning related to estimation of a distance image closer to reality related to an object than a distance image related to the object captured by an imaging sensor from the distance image, including a data acquisition unit for acquiring distance image data related to the object, and a preprocessing unit for creating input data from the distance image data related to the object, in which processing of machine learning for estimating distance image data close to reality related to the object from the distance image data related to the object is performed using the input data.

Another aspect of the present disclosure is a machine learning processing method of an imaging apparatus performing processing of machine learning for estimating a distance image closer to reality related to an object based on a distance image related to the object captured by an imaging sensor, executing a first step of acquiring distance image data related to the object, a second step of creating input data from the distance image data related to the object, and a third step of performing processing of machine learning for estimating distance image data close to reality related to the object from distance image data related to the object using the input data.

Another aspect of the present disclosure is an imaging system in which a plurality of apparatuses is connected to each other via a network, in which the plurality of apparatuses includes an imaging apparatus including at least a learning unit.

According to the aspects of the present disclosure, it is possible to estimate, from a distance image in which a shape of an object is broken, a distance image closer to reality related to the object than the distance image.

BRIEF DESCRIPTION OF THE DRAWINGS

The above-described and other object and characteristic of the application will be apparent from description of embodiments below with reference to accompanying drawings. In the drawings.

DETAILED DESCRIPTION OF THE PREFERRED EMBODIMENTS

Hereinafter, embodiments of the application will be described with reference to drawings.

Figure 1:
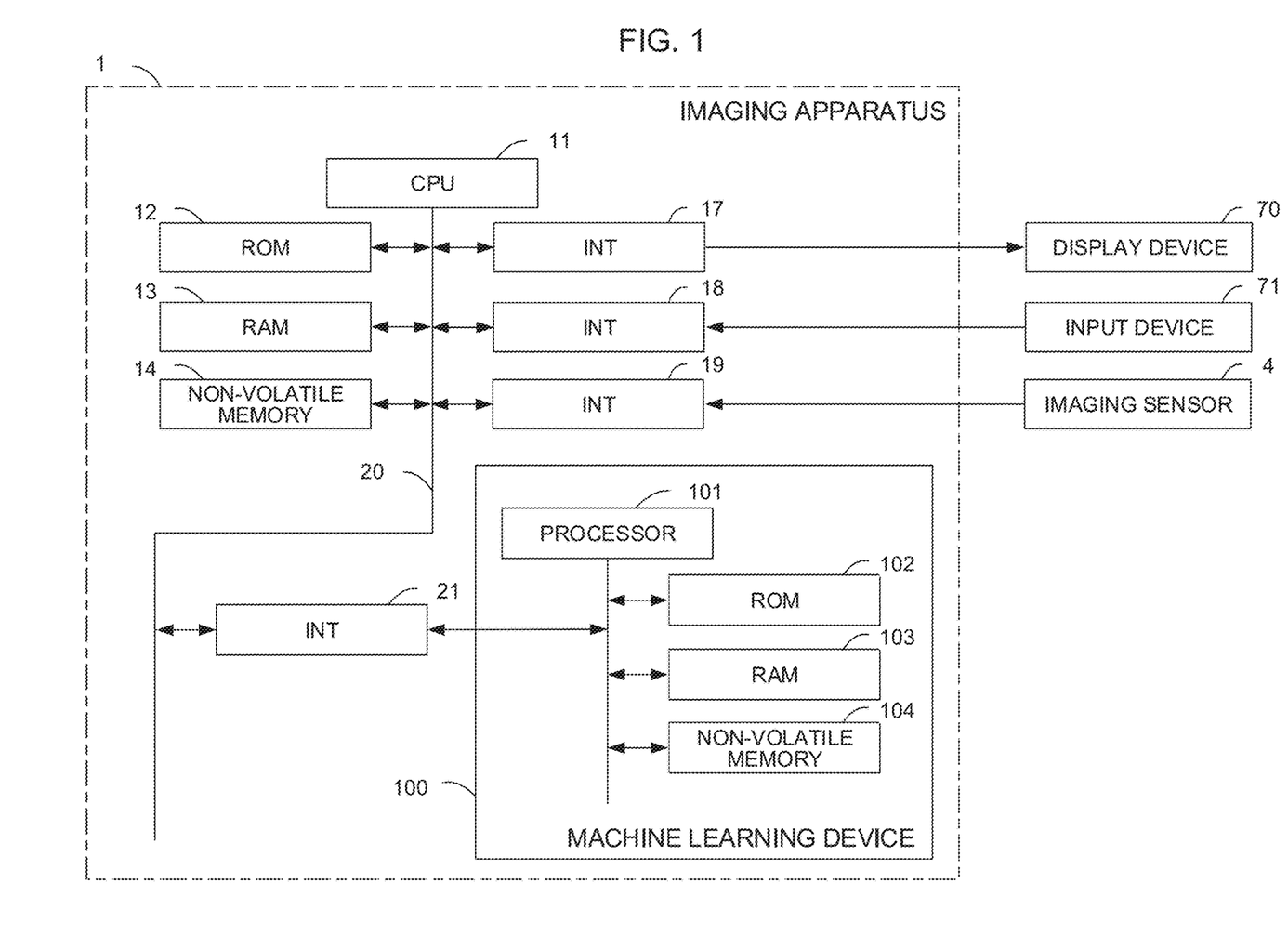
FIG. 1 is a schematic hardware configuration diagram illustrating an imaging apparatus including a machine learning device according to an embodiment.

FIG. 1 is a schematic hardware configuration diagram illustrating an imaging apparatus including a machine learning device according to an embodiment. The imaging apparatus 1 of the present embodiment is mounted on a computer such as a personal computer installed in a factory, a cell computer, a host computer, an edge computer, a cloud server, etc for managing a machine installed in the factory. FIG. 1 illustrates an example in which the imaging apparatus 1 is mounted on the personal computer installed in the factory.

A central processing unit (CPU) 11 included in the imaging apparatus 1 according to the present embodiment is a processor that controls the imaging apparatus 1 as a whole. The CPU 11 reads a system program stored in a read only memory (ROM) 12 via a bus 20. The CPU 11 controls the entire imaging apparatus 1 in accordance with the system program. Temporary calculation data, various data input by an operator via an input device 71, etc. are temporarily stored in a random access memory (RAM) 13.

For example, a non-volatile memory 14 includes a memory backed up by a battery (not illustrated), a solid state drive (SSD), etc. A storage state of the non-volatile memory 14 is maintained even when the power of the imaging apparatus 1 is turned off. A setting area in which setting information related to an operation of the imaging apparatus 1 is stored is secured in the non-volatile memory 14. The non-volatile memory 14 stores a program, data, etc. input from the input device 71 and CAD data, etc. read via an external storage device (not illustrated) or a network. A program and various data stored in the non-volatile memory 14 may be loaded in the RAM 13 during execution/use. In addition, a known analysis program for analyzing a learning data set, a system program for controlling exchange with the machine learning device 100 described below, etc. are written to the ROM 12 in advance.

For example, an imaging sensor 4 is a 3D vision sensor that generates distance image data (two-dimensional (2D) or one-dimensional (1D) array data having distance information as a value) of an object by capturing an image of the object. The 3D vision sensor as the imaging sensor 4 may correspond to a sensor of a triangulation system including a plurality of charge coupled device (CCD) sensors, a sensor of a time-of-flight system, or a sensor of a focusing system. For example, the imaging sensor 4 is attached to a hand of a robot (not illustrated). The imaging sensor 4 is moved by the robot to an imaging position at which an image of an object to be determined is captured. The imaging sensor 4 transfers distance image data obtained by capturing an image of the object to the CPU 11 via an interface 19. In addition, a distance image of the object may be captured by fixedly installing the imaging sensor 4 at a predetermined position and moving the object held by the hand of the robot to a position at which image capturing can be performed by the imaging sensor 4. A control operation related to image capturing of the object by the imaging sensor 4 may be performed by the imaging apparatus 1 executing a program. Imaging capturing of the object by the imaging sensor 4 may be performed under the control of a robot controller that controls the robot or other devices.

Various data read into the memory and data obtained as a result of execution of a program, etc. are displayed on the display device 70. In addition, distance image data of an object obtained by image capturing by the imaging sensor 4, data output from the machine learning device 100 described below, etc. are output via the interface 17 and displayed on the display device 70. In addition, the input device 71 including a keyboard, a pointing device, etc. receives an instruction, data, etc. based on an operation by the operator. The input device 71 transfers the instruction, data, etc. to the CPU 11 via an interface 18.

An interface 21 connects the imaging apparatus 1 and the machine learning device 100 to each other. The machine learning device 100 includes a processor 101 that controls the entire machine learning device 100 and a ROM 102 that stores a system program, etc. The machine learning device 100 includes a RAM 103 for temporarily storing each process related to machine learning. The machine learning device 100 includes a non-volatile memory 104 used for storing a learning model, etc. The machine learning device 100 observes each piece of information (for example, distance image data, CAD data, etc.) that can be acquired by the imaging apparatus 1 via the interface 21. In addition, the imaging apparatus 1 acquires a processing result output from the machine learning device 100 via the interface 21.

Figure 2:
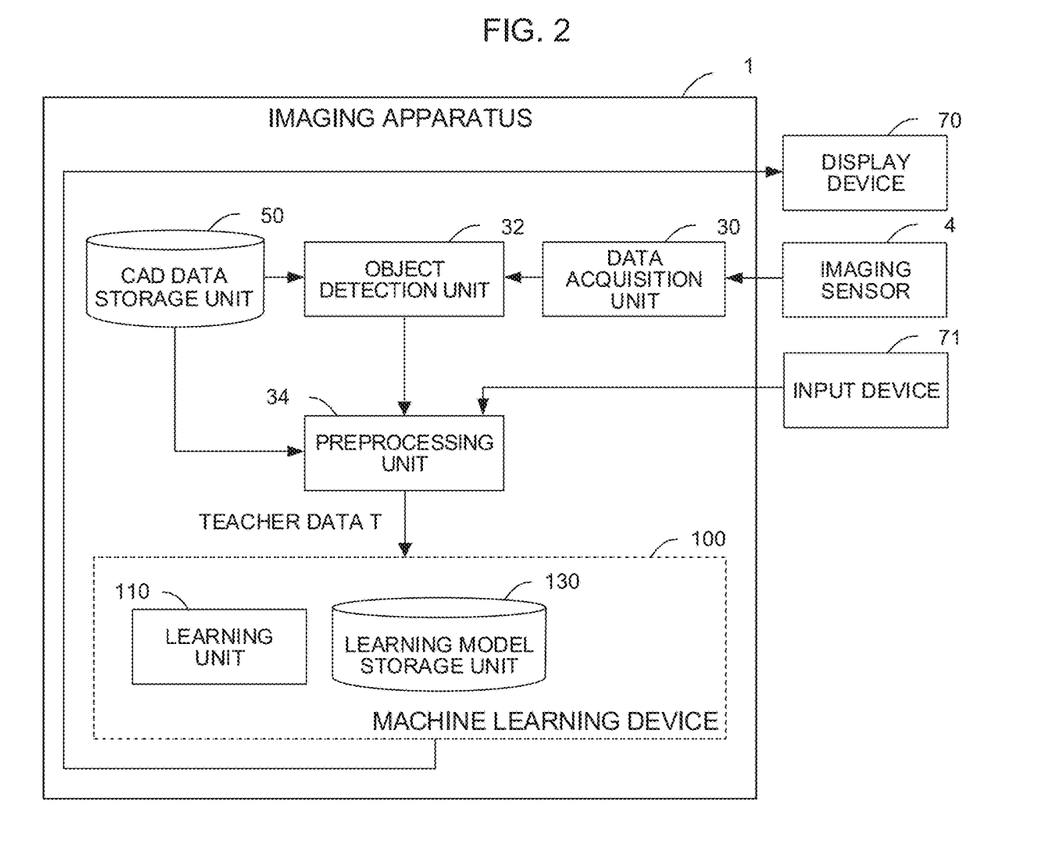
FIG. 2 is a schematic functional block diagram of an imaging apparatus according to a first embodiment.

FIG. 2 is a schematic functional block diagram in a learning mode of the imaging apparatus 1 and the machine learning device 100 according to the first embodiment. Respective functions of functional blocks illustrated in FIG. 2 are realized by the CPU 11 of the imaging apparatus 1 and the processor 101 of the machine learning device 100 illustrated in FIG. 1 executing system programs thereof and controlling operations of respective units of the imaging apparatus 1 and the machine learning device 100, respectively.

The imaging apparatus 1 of the present embodiment includes a data acquisition unit 30, an object detection unit 32, and a preprocessing unit 34. The machine learning device 100 included in the imaging apparatus 1 includes a learning unit 110. CAD data related to an object used for learning (a plurality of objects may be present) is stored in a CAD data storage unit 50 provided on the non-volatile memory 14 in advance via an external storage device or a wired/wireless network (not illustrated).

The data acquisition unit 30 is functional means that acquires distance image data related to the object from the imaging sensor 4 or via an external storage device or a wired/wireless network (not illustrated). The distance image data acquired by the data acquisition unit 30 is data in which a distance from the imaging sensor 4 is set for each pixel of a 2D imaging surface.

The object detection unit 32 is functional means that acquires, from the distance image data related to the object acquired by the data acquisition unit 30, a position and a posture of the object in the distance image data. For example, the object detection unit 32 specifies a shape of the object using CAD data related to the object read from the CAD data storage unit 50. The object detection unit 32 performs matching processing between the CAD data and the distance image data while changing the position and the posture of the CAD data. In this way, the object detection unit 32 specifies the position and the posture of the object from the distance image data.

Figure 3:
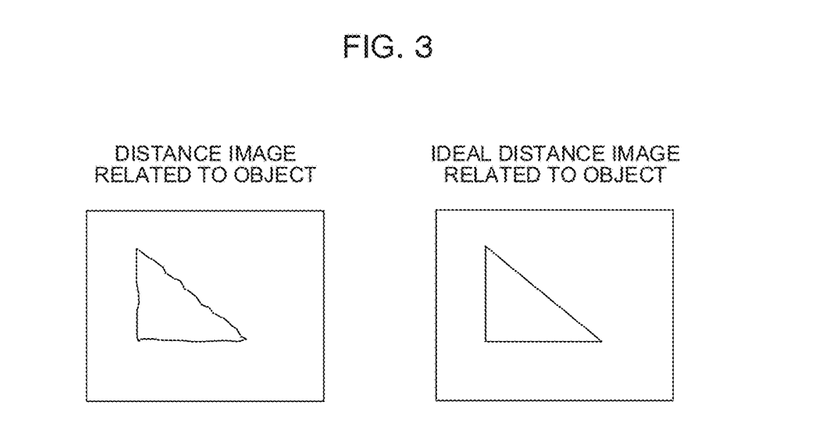
FIG. 3 is a diagram illustrating distance image data and distance image data close to reality related to an object.

The preprocessing unit 34 creates teacher data used for learning by the machine learning device 100 based on the distance image data related to the object and the CAD data related to the object. The preprocessing unit 34 creates teacher data T in which the distance image data related to the object is used as input data and distance image data close to reality related to the object generated from the CAD data (data of a distance image closer to reality than a distance image related to the object acquired by the data acquisition unit 30 and data of an ideal distance image related to the object) is used as output date. FIG. 3 is a diagram illustrating an example of the distance image related to the object and the distance image close to reality related to the object. As described above, in accordance with a distance image generation algorithm, a distance detection error occurs in a portion of the object in which the distance to the imaging sensor 4 changes. For this reason, the portion is easily broken. For example, the preprocessing unit 34 disposes the CAD data at the same position and posture as the position and posture of the object with respect to the imaging sensor 4 for a viewpoint position in virtual space, and generates distance image data close to reality related to the object from a shape of the CAD data viewed from the viewpoint position at that time. In the distance image close to reality related to the object generated in this manner, no error occurs even in a portion where a distance to a viewpoint changes. For this reason, the image is not broken. A jig, etc. for fixing the object may be captured together with the distance image data related to the object. In this case, the preprocessing unit 34 may acquire CAD data related to the jig in advance and dispose the CAD data related to the jig in the virtual space similarly to the CAD data related to the object so that the CAD data is included in the distance image data close to reality related to the object.

The learning unit 110 is functional means that performs supervised learning using the teacher data T created by the preprocessing unit 34. The learning unit 110 generates (learns) a learned model used to estimate distance image data close to reality related to the object from the distance image data related to the object. For example, the learning unit 110 of the present embodiment may be configured to perform supervised learning using a neural network as a learning model. In this case, a neural network including three layers of an input layer, an intermediate layer, and an output layer may be used as the learning model. Alternatively, a neural network having three or more layers may be used as the learning model. That is, a deep learning method may be used. In this case, more effective learning and inference are performed. The learned model generated by the learning unit 110 is stored in a learning model storage unit 130 provided on the non-volatile memory 104. The learned model is used for estimation processing of distance image data close to reality related to the object by an estimation unit 120.

The learning unit 110 repeatedly performs the above-mentioned learning using distance image data related to various objects (different objects) acquired by the data acquisition unit 30 and distance image data related to the object captured by changing an imaging condition (an illumination position, etc.). In this way, the learning unit 110 generates a learned model used to estimate distance image data close to reality related to the object from the distance image data related to the object. The generated learned model is used to acquire a distance image closer to reality regardless of the object or the imaging condition. That is, by using the generated learned model, a distance image closer to reality is acquired regardless of how the object in the distance image obtained from the imaging sensor 4 is broken.

In a modification of the imaging apparatus 1 of the present embodiment, the data acquisition unit 30 not only acquires distance image data related to the object, but also acquires image data of another format such as luminance image data related to an object whose image is captured in the same positional relationship as a positional relationship between the imaging sensor 4 and the object at the time of acquiring the distance image. The data acquisition unit 30 performs learning using the acquired image data of another format as auxiliary image data for assisting the distance image data. In this case, the preprocessing unit 34 creates the teacher data T using the distance image data and the auxiliary image data related to the object as input data. The learning unit 110 performs supervised learning using the created teacher data T. In this way, a learned model for estimating distance image data close to reality related to the object is constructed based on information related to more objects. By using this learned model, accuracy of estimation of the distance image data close to reality by the estimation unit 120 is improved.

In another modification of the imaging apparatus 1 of the present embodiment, for example, the distance image data close to reality related to the object used when the teacher data T is created is created based on an image obtained using a high-precision imaging sensor. Examples of the high-accuracy imaging sensor include an imaging sensor having high resolution and a sensor that can detect luminance and other physical quantities in addition to the distance image and detect the distance with higher accuracy based on the information. Even though such an imaging sensor is expensive, the imaging sensor is used only at a construction stage of the learned model and can be used for other purposes after the learned model is constructed, which is an advantage. In addition, such an imaging sensor has an advantage that the imaging sensor can be used for construction of the learned model even when the CAD data of the object may not be obtained.

Figure 4:
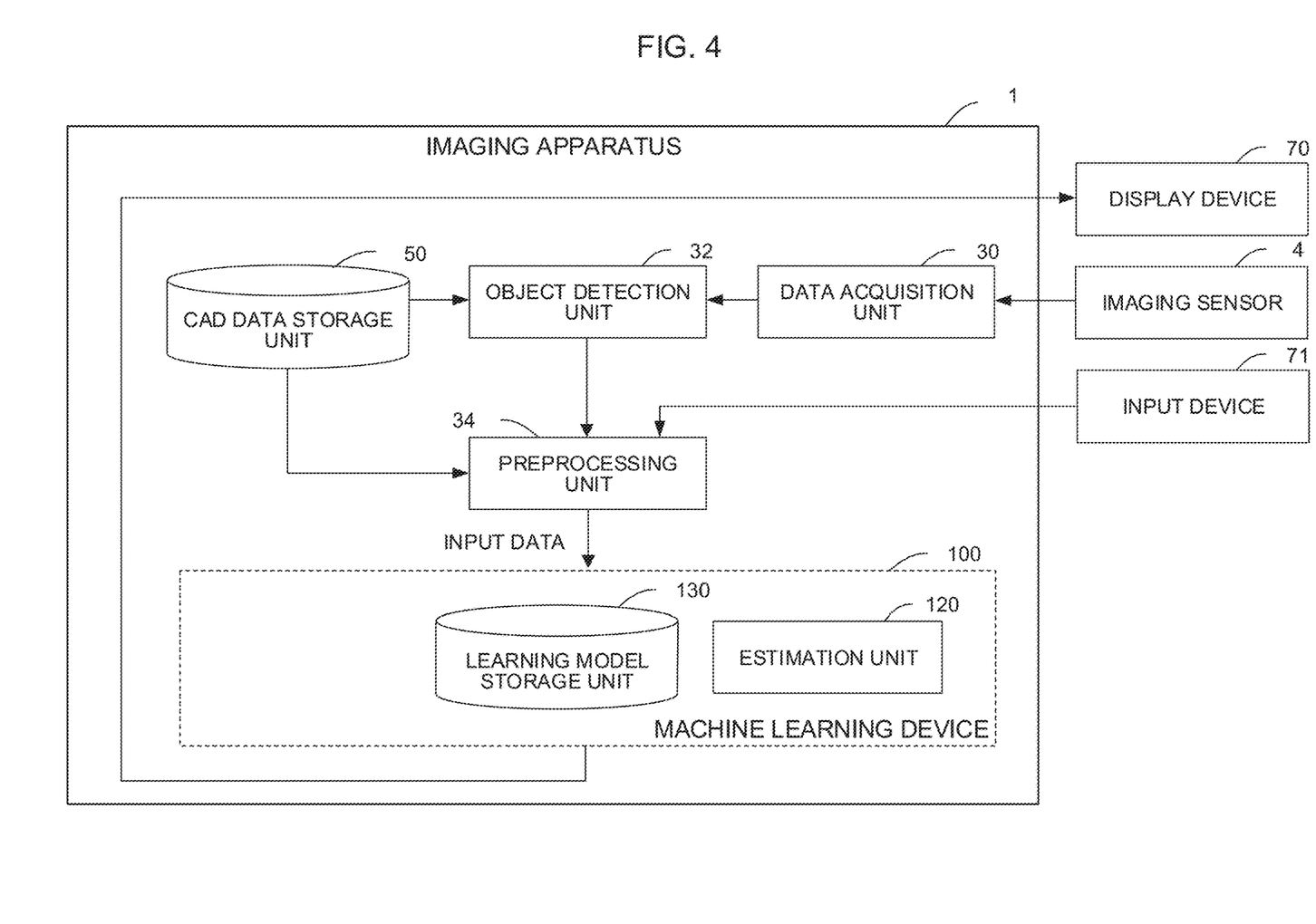
FIG. 4 is a schematic functional block diagram of an imaging apparatus according to a second embodiment.

FIG. 4 is a schematic functional block diagram in an estimation mode of the imaging apparatus 1 and the machine learning device 100 according to the second embodiment. Respective functions of functional blocks illustrated in FIG. 4 are realized by the CPU 11 of the imaging apparatus 1 and the processor 101 of the machine learning device 100 illustrated in FIG. 1 executing system programs thereof and controlling operations of respective units of the imaging apparatus 1 and the machine learning device 100, respectively.

The imaging apparatus 1 of the present embodiment estimates distance image data closer to reality than the distance image related to the object based on the distance image data related to the object acquired by the data acquisition unit 30 in the estimation mode. In the imaging apparatus 1 according to the present embodiment, functions of a data acquisition unit 30 and an object detection unit 32 are the same as those in the first embodiment.

A preprocessing unit 34 creates input data to be used for estimation in the machine learning device 100 based on the distance image data related to the object.

An estimation unit 120 estimates an image close to reality related to the object using a learned model stored in a learning model storage unit 130 based on input data input from the preprocessing unit 34. The estimation unit 120 of the present embodiment inputs input data (distance image data related to the object) input from the preprocessing unit 34 to a learned model generated (whose parameter has been determined) by supervised learning by the learning unit 110. In this way, the estimation unit 120 estimates (calculates) distance image data close to reality related to the object. For example, the distance image data close to the reality related to the object estimated by the estimation unit 120 is displayed and output on the display device 70. The distance image data close to reality related to the object estimated by the estimation unit 120 may be transmitted and output to a host computer, a cloud computer, etc. via a wired/wireless network (not illustrated) and used.

In the imaging apparatus 1 of the present embodiment configured as described above, distance image data close to reality related to the object is estimated using a learned model obtained based on a plurality of pieces of teacher data obtained by capturing images of various objects under various imaging conditions.

Figure 5:
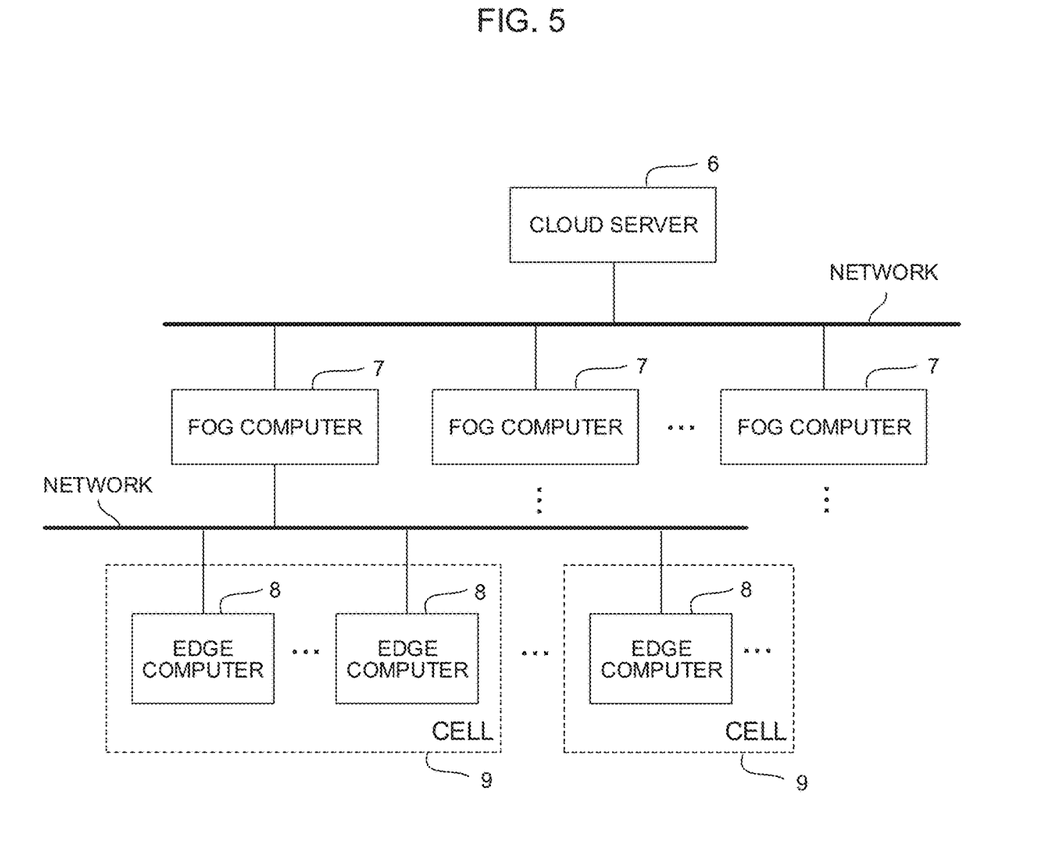
FIG. 5 is a diagram illustrating an example of a three-tiered system including a cloud server, a fog computer, and an edge computer.

In third to fifth embodiments below, a description will be given of embodiments in which the imaging apparatus 1 according to the first embodiment is mounted as a part of a system interconnected with a plurality of devices including a cloud server, a host computer, a fog computer, and an edge computer (a robot controller, a controller, etc.) via a wired/wireless network. As illustrated in FIG. 5, in the third to fifth embodiments below, note that a system is configured by being logically divided into three layers of a layer including a cloud server 6, etc., a layer including a fog computer 7, etc., and a layer including an edge computer 8 (a robot controller, a controller, etc. included in a cell 9), etc. in a state in which each of a plurality of devices is connected to a network. In such a system, the imaging apparatus 1 according to an aspect of the application may be mounted in any of the cloud server 6, the fog computer 7, and the edge computer 8. The imaging apparatus 1 may perform distributed learning by mutually sharing data used in processing related to machine learning with each of the plurality of devices via a network. In addition, the imaging apparatus 1 may collect the generated learning model in the fog computer 7 or the cloud server 6 to perform large-scale analysis. Furthermore, the imaging apparatus 1 may perform mutual reuse, etc. of the generated learning model. In the system illustrated in FIG. 5, a plurality of cells 9 is provided in each local factory, and each of the cells 9 is managed by the fog computer 7 in an upper layer in a predetermined unit (a unit of a factory, a unit of a plurality of factories of the same manufacturer, etc.). Further, data collected and analyzed by the fog computer 7 is further collected by the cloud server 6 in an upper layer, and analysis, etc. is performed. Resultant information is utilized for control, etc. in each edge computer 8.

Figure 6:
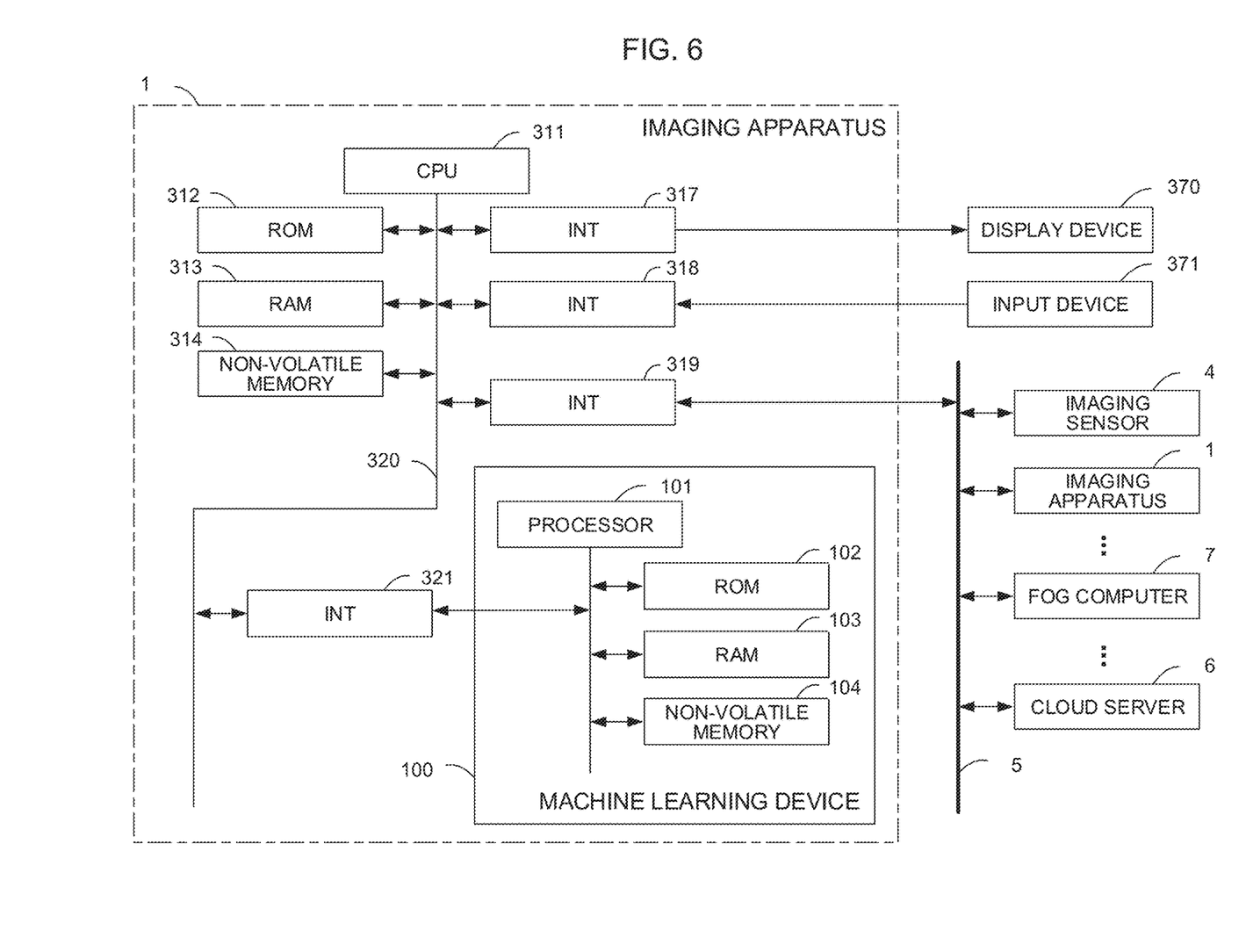
FIG. 6 is a schematic hardware configuration diagram of an imaging apparatus mounted on a computer.

FIG. 6 is a schematic hardware configuration diagram in a case where an imaging apparatus is mounted on a computer such as a cloud server or a fog computer.

A CPU 311 included in an imaging apparatus 1' mounted on a computer according to the present embodiment is a processor that controls the entire imaging apparatus 1'. The CPU 311 reads a system program stored in a ROM 312 via a bus 320. The CPU 311 controls the entire imaging apparatus 1' in accordance with the system program. A RAM 313 temporarily stores temporary calculation data or display data, various data input by the operator via an input unit (not illustrated), etc.

A non-volatile memory 314 is backed up by, for example, a battery (not illustrated). The non-volatile memory 314 is a memory, a storage state of which is maintained even when the power of the imaging apparatus 1' is turned off. The non-volatile memory 314 stores a program input via an input device 371 and various data acquired from respective components of the imaging apparatus 1' or an imaging sensor 4, etc. via a network 5. The program and various data stored in the non-volatile memory 314 may be loaded in the RAM 313 during execution/use. In addition, various system programs such as a known analysis program, etc. (including a system program for controlling exchange with a machine learning device 100 described below) are written in the ROM 312 in advance.

The imaging apparatus 1' is connected to the wired/wireless network 5 via an interface 319. At least one imaging sensor, another imaging apparatus 1, an edge computer 8, a fog computer 7, a cloud server 6, etc. are connected to the network 5, and these devices mutually exchange data with the imaging apparatus 1'.

Various data read into a memory, data obtained as a result of execution of a program, etc. are output to and displayed on a display device 370 via an interface 317. In addition, the input device 371 including a keyboard, a pointing device, etc. transfers an instruction, data, etc. based on an operation by the operator to the CPU 311 via an interface 318.

An interface 321 is an interface for connecting the imaging apparatus 1' and the machine learning device 100 to each other. The machine learning device 100 has a similar configuration to that described in FIG. 1.

As described above, when the imaging apparatus 1' is mounted on a computer such as a cloud server, a fog computer, etc., a function of the imaging apparatus 1' is similar to that described in the first and second embodiments except that information from the imaging sensor 4 is exchanged via the network 5.

Figure 7:
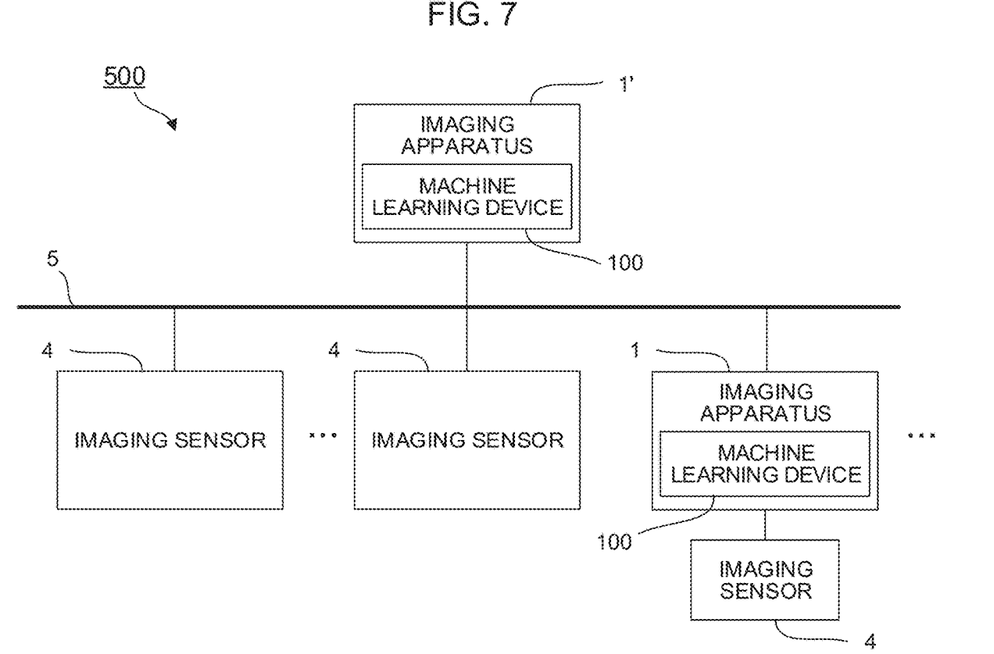
FIG. 7 is a schematic configuration diagram of an imaging system according to a third embodiment.

FIG. 7 is a schematic configuration diagram of an imaging system according to a third embodiment including the imaging apparatus 1'. An imaging system 500 includes a plurality of imaging apparatuses 1 and 1', a plurality of imaging sensors 4, and a network 5 that connects the imaging apparatuses 1 and 1' and the imaging sensors 4 to each other.

In the imaging system 500, the imaging apparatus 1' including the machine learning device 100 estimates a distance image close to reality related to the object whose image is captured by the imaging sensor 4 using a learning result of the learning unit 110. In addition, at least one imaging apparatus 1' learns a distance image close to reality related to the object common to all the imaging apparatuses 1 and 1' based on the teacher data T obtained by each of the plurality of other imaging apparatuses 1 and 1'. The imaging system 500 is configured such that the learning result is shared by all the imaging apparatuses 1 and 1'. Therefore, in the imaging system 500, a more diverse data set (including the teacher data T) is used as an input, and a speed and reliability of learning are improved.

Figure 8:
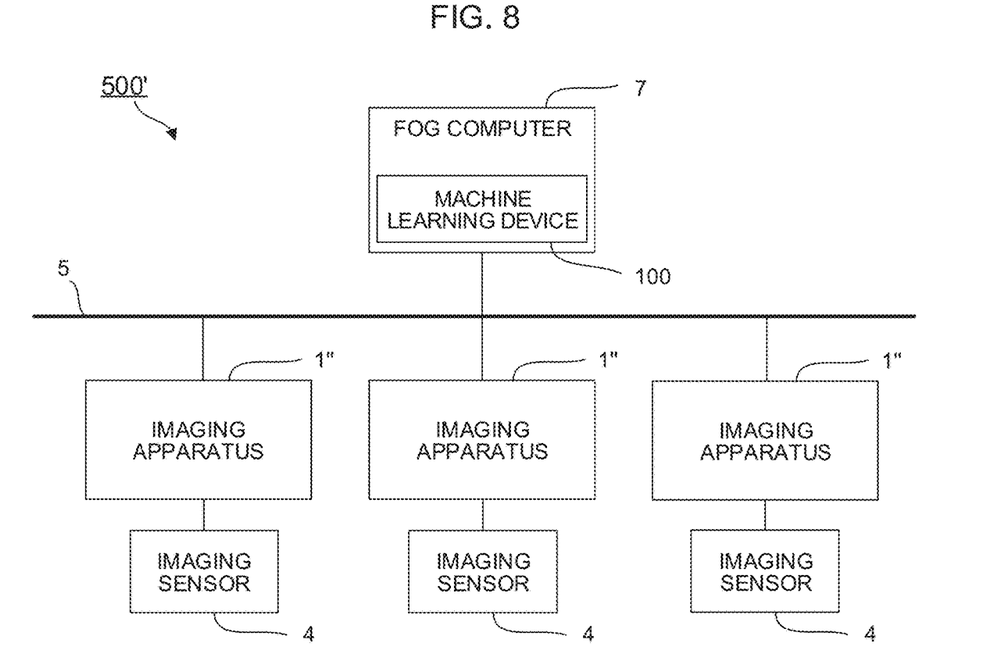
FIG. 8 is a schematic configuration diagram of an imaging system according to a fourth embodiment.

FIG. 8 is a schematic configuration diagram of a system according to a fourth embodiment in which a machine learning device and an imaging apparatus are mounted on different devices. An imaging system 500' includes at least one machine learning device 100 mounted as a part of a computer such as a cloud server, a host computer, a fog computer, etc. (FIG. 8 illustrates an example in which the machine learning device 100 is mounted as a part of a fog computer 7), a plurality of imaging apparatuses 1", and a network 5 that connects the imaging apparatuses 1" and the computer to each other. Similarly to hardware of the imaging apparatus 1' illustrated in FIG. 6, hardware of the computer is configured by connection of hardware included in a general computer such as the CPU 311, the RAM 313, the non-volatile memory 314, etc. via the bus 320.

In the imaging system 500' having the above-mentioned configuration, the machine learning device 100 learns a correlation between a distance image of the object and a distance image close to reality related to the object common to all the imaging apparatuses 1" based on teacher data T obtained for each of the plurality of imaging apparatuses 1". In the imaging system 500', a distance image close to reality can be estimated from an image of the object captured by each imaging sensor 4 using a learning result thereof. According to the configuration of the imaging system 500', a necessary number of imaging apparatuses 1" can be connected to the machine learning device 100 as necessary regardless of an existing place or time.

Figure 9:
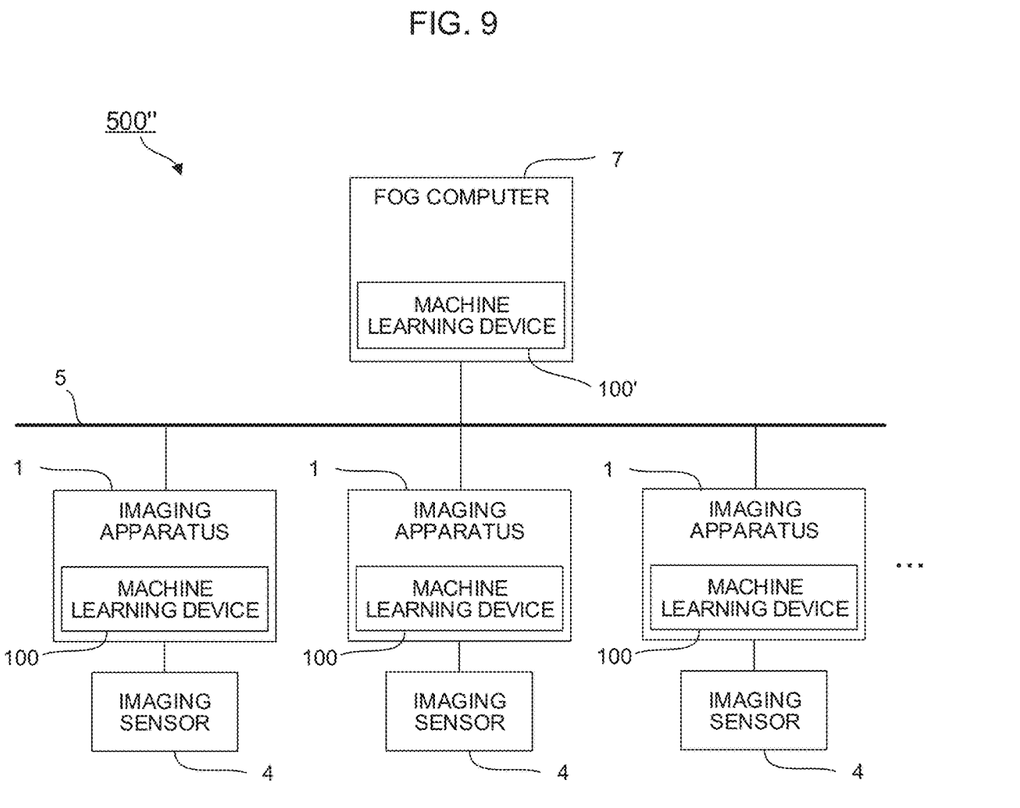
FIG. 9 is a schematic configuration diagram of an imaging system according to a fifth embodiment.

FIG. 9 is a schematic configuration diagram of an imaging system 500" according to a fifth embodiment including the machine learning device 100' and the imaging apparatus 1. The imaging system 500" includes at least one machine learning device 100' mounted on a computer such as an edge computer, a fog computer, a host computer, a cloud server, etc. (FIG. 9 illustrates an example in which the machine learning device 100' is mounted as a part of a fog computer 7), a plurality of imaging apparatuses 1, and a wired/wireless network 5 that connects the imaging apparatuses 1 and the computer to each other.

In the imaging system 500" having the above-mentioned configuration, the fog computer 7 including the machine learning device 100' acquires, from each of the imaging apparatuses 1, a learning model obtained as a result of machine learning by the machine learning device 100 included in the imaging apparatus 1. Further, the machine learning device 100' generates a newly optimized or streamlined learning model by performing processing of optimization or streamlining of knowledge based on a plurality of learning models. The machine learning device 100' distributes the generated learning model to each of the imaging apparatuses 1.

Examples of optimization or streamlining of a learning model performed by the machine learning device 100' include generation of a distillation model based on a plurality of learning models acquired from the respective imaging apparatuses 1. In this case, the machine learning device 100' according to this example creates input data being input to the learning model. The machine learning device 100' performs learning from a beginning using an output obtained as a result of the input data being input to each learning model. The machine learning device 100' generates a new learning model (distillation model) using such a method. As described above, the distillation model generated in this manner is distributed to the imaging apparatus 1 or another computer via an external storage medium or the network 5 and utilized.

Next, another example of optimization or streamlining of a learning model performed by the machine learning device 100' is shown. In a process in which distillation is performed on a plurality of learning models acquired from the respective imaging apparatuses 1, a distribution of output data of each learning model with respect to input data is analyzed by a general statistical method (for example, an outlier test, etc.). An outlier of a set of the input data and the output data is extracted, and distillation is performed using the set of the input data and the output data from which the outlier is excluded. Through such a process, an exceptional estimation result is excluded from a set of input data and output data obtained from each learning model. As a result, a distillation model is generated using the set of the input data and the output data from which the exceptional estimation result is excluded. The distillation model generated in this manner is utilized as a more versatile learning model when compared to learning models generated by the plurality of imaging apparatuses 1.

Other general learning model optimization or streamlining methods (such as analyzing each learning model and optimizing a hyper parameter of the learning model based on an analysis result) may be appropriately introduced.

In the imaging system 500" according to this example, for example, the machine learning device 100' is disposed on the fog computer 7 installed for the plurality of imaging apparatuses 1 as edge computers. In the imaging system 500", learning models generated in the respective imaging apparatuses 1 are integrated and stored on the fog computer 7. In the imaging system 500", optimization or streamlining based on a plurality of stored learning models is performed, and an optimized or streamlined learning model is redistributed to each imaging apparatus 1 as necessary.

In addition, in the imaging system 500" according to this example, for example, a learning model integrated and stored on the fog computer 7 or a learning model optimized or streamlined on the fog computer 7 may be integrated on a host computer or a cloud server in a higher rank. In this case, application to intelligent operation in a factory or a manufacturer of the imaging apparatus 1 (construction and redistribution of a further general learning model in an upper server, support of maintenance operation based on an analysis result of a learning model, analysis of performance, etc. of each imaging apparatus 1, application to development of a new machine, etc.) is performed using these learning models.

As mentioned above, even though the embodiments of the application have been described, the application can be implemented in various modes by adding an appropriate change, without being limited only to the examples of embodiments mentioned above.

For example, a learning algorithm executed by the machine learning device 100, an operation algorithm executed by the machine learning device 100, a control algorithm executed by the imaging apparatus 1, etc. are not limited to those described above, and various algorithms are adopted.

In addition, even though the embodiments have described the imaging apparatus 1 and the machine learning device 100 as devices having different CPUs (processors), the machine learning device 100 may be realized by the CPU 11 included in the imaging apparatus 1 and the system program stored in the ROM 12.

The invention claimed is:

1. An imaging apparatus for performing processing of machine learning related to estimation of a distance image closer to reality related to an object than a distance image related to the object captured by an imaging sensor from the distance image, the imaging apparatus comprising:
   a data acquisition unit for acquiring distance image data related to the object; and
   a preprocessing unit for creating input data from the distance image data related to the object,
   wherein
      processing of machine learning for estimating distance image data close to reality related to the object from the distance image data related to the object is performed using the input data,
      the preprocessing unit creates teacher data in which the distance image data related to the object is input data and the distance image data close to reality related to the object is output data, and
      the imaging apparatus further comprises a learning unit for performing supervised learning related to the processing of the machine learning based on the teacher data and generating a learned model for estimating the distance image data close to reality related to the object from the distance image data related to the object.

2. The imaging apparatus according to claim 1, further comprising
an object detection unit for detecting a position and a posture of the object from the distance image data related to the object acquired by the data acquisition unit.

3. The imaging apparatus according to claim 1, further comprising
a CAD data storage unit for storing CAD data related to the object,
wherein the preprocessing unit generates the distance image data close to reality related to the object based on the CAD data related to the object stored in the CAD data storage unit.

4. The imaging apparatus according to claim 1, further comprising:
an object detection unit for detecting a position and a posture of the object from the distance image data related to the object acquired by the data acquisition unit; and
a CAD data storage unit for storing CAD data related to the object,
wherein the preprocessing unit generates distance image data close to reality related to the object based on the CAD data related to the object stored in the CAD data storage unit and the position and the posture of the object detected by the object detection unit.

5. The imaging apparatus according to claim 1,
wherein the preprocessing unit generates distance image data close to reality related to the object based on a distance image related to the object captured by an imaging sensor having higher accuracy than accuracy of the imaging sensor.

6. The imaging apparatus according to claim 1,
wherein the data acquisition unit acquires luminance image data of the object in addition to the distance image data related to the object, and
the preprocessing unit uses the distance image data related to the object and the luminance image data as input data.

7. The imaging apparatus according to claim 1, further comprising:
a learning model storage unit storing a learned model for estimating the distance image data close to reality related to the object from the distance image data related to the object; and
an estimation unit for estimating the distance image data close to reality related to the object from the distance image data related to the object using the input data and the learned model as the processing of the machine learning.

8. A machine learning processing method of an imaging apparatus performing processing of machine learning for estimating a distance image closer to reality related to an object based on a distance image related to the object captured by an imaging sensor, the machine learning processing method executing:
a first step of acquiring distance image data related to the object;
a second step of creating input data from the distance image data related to the object; and
a third step of performing processing of machine learning for estimating distance image data close to reality related to the object from distance image data related to the object using the input data,
wherein the second step is a step of creating teacher data in which the distance image data related to the object is input data and the distance image data close to reality related to the object is output data, and the third step performs supervised learning based on the teacher data and generates a learned model for estimating the distance image data close to reality related to the object from the distance image data related to the object as the processing of the machine learning.

9. The machine learning processing method of the imaging apparatus according to claim 8,
wherein the third step estimates the distance image data close to reality related to the object from the distance image data related to the object using the input data and a learned model for estimating the distance image data close to reality related to the object from the distance image data related to the object as the processing of the machine learning.

10. An imaging system in which a plurality of apparatuses is connected to each other via a network,
wherein the plurality of apparatuses includes a first imaging apparatus corresponding to the imaging apparatus according to claim 1.

11. The imaging system according to claim 10,
wherein the plurality of apparatuses includes a computer including a machine learning device,
the computer acquires a learning model as a result of learning of at least one of first imaging apparatuses, and
the machine learning device included in the computer performs optimization or streamlining based on the acquired learning model.

12. The imaging system according to claim 10,
wherein the plurality of apparatuses includes a second imaging apparatus different from the first imaging apparatus, and
a learning result by the first imaging apparatus is shared with the second imaging apparatus.

13. The imaging system according to claim 10,
wherein the plurality of apparatuses includes a second imaging apparatus different from the first imaging apparatus, and
data observed in the second imaging apparatus is available for learning by the first imaging apparatus via the network.

14. An imaging apparatus for performing processing of machine learning related to estimation of a distance image closer to reality related to an object than a distance image related to the object captured by an imaging sensor from the distance image, the imaging apparatus comprising:
a processor configured to
acquire distance image data related to the object,
create input data from the distance image data related to the object, and
perform, using the input data, processing of machine learning for estimating distance image data close to reality related to the object from the distance image data related to the object,
wherein the processor is further configured to
create teacher data in which the distance image data related to the object is input data and the distance image data close to reality related to the object is output data, and perform supervised learning related to the processing of the machine learning based on the teacher data and generate a learned model for estimating the distance image data close to reality related to the object from the distance image data related to the object.

15. The imaging apparatus according to claim 14, wherein the processor is further configured to detect a position and a posture of the object from the distance image data related to the acquired object.

16. The imaging apparatus according to claim 14, further comprising a CAD data storage for storing CAD data related to the object, wherein the processor is further configured to generate the distance image data close to reality related to the object based on the CAD data related to the object stored in the CAD data storage.

17. The imaging apparatus according to claim 14, wherein the processor is further configured to detect a position and a posture of the object from the distance image data related to the acquired object, the imaging apparatus further comprises a CAD data storage for storing CAD data related to the object, and the processor is further configured to generate distance image data close to reality related to the object based on the CAD data related to the object stored in the CAD data storage and the detected position and the detected posture of the object.

18. The imaging apparatus according to claim 14, wherein the processor is further configured to generate distance image data close to reality related to the object based on a distance image related to the object captured by an imaging sensor having higher accuracy than accuracy of the imaging sensor.

19. The imaging apparatus according to claim 14, wherein the processor is further configured to acquire luminance image data of the object in addition to the distance image data related to the object, and use the distance image data related to the object and the luminance image data as input data.

20. The imaging apparatus according to claim 14, further comprising:

a learning model storage for storing a learned model for estimating the distance image data close to reality related to the object from the distance image data related to the object, wherein the processor is further configured to estimate the distance image data close to reality related to the object from the distance image data related to the object using the input data and the learned model as the processing of the machine learning.

* * * * *